US012109719B2

(12) United States Patent
Poulin et al.

(10) Patent No.: US 12,109,719 B2
(45) Date of Patent: Oct. 8, 2024

(54) RE-SEALER FOR A MULTI-PLY CUTTER

(71) Applicant: GERBER TECHNOLOGY LLC, Tolland, CT (US)

(72) Inventors: Brett Poulin, Tolland, CT (US); Hong Pan, Glastonbury, CT (US)

(73) Assignee: GERBER TECHNOLOGY LLC, Tolland, CT (US)

( * ) Notice: Subject to any disclaimer, the term of this patent is extended or adjusted under 35 U.S.C. 154(b) by 89 days.

(21) Appl. No.: 17/341,186

(22) Filed: Jun. 7, 2021

(65) Prior Publication Data

US 2021/0379785 A1 Dec. 9, 2021

Related U.S. Application Data

(60) Provisional application No. 63/036,132, filed on Jun. 8, 2020.

(51) Int. Cl.

*B26D 7/01* (2006.01)
*A41H 43/02* (2006.01)
*B26F 1/38* (2006.01)

(52) U.S. Cl.

CPC .......... *B26D 7/018* (2013.01); *A41H 43/0292* (2013.01); *B26F 1/3813* (2013.01)

(58) Field of Classification Search

CPC ......... B26D 7/018; B26D 7/20; B26F 1/3813; A41H 43/0292; Y10T 83/748; Y10T 83/2185; Y10S 83/938; Y10S 83/941

See application file for complete search history.

(56) References Cited

U.S. PATENT DOCUMENTS

| | | | | |
|---|---|---|---|---|
| 3,742,802 A | | 7/1973 | Maerz | |
| 4,542,673 A | * | 9/1985 | Pearl | B26D 7/018 83/422 |
| 4,730,779 A | | 3/1988 | Thievessen | |

(Continued)

FOREIGN PATENT DOCUMENTS

| | | | | | |
|---|---|---|---|---|---|
| CN | 105502037 A | | 4/2016 | | |
| DE | 4344814 A1 | * | 6/1995 | | B26D 7/018 |
| EP | 0567076 A1 | | 10/1993 | | |

OTHER PUBLICATIONS

International Search Report and Written Opinion issued in corresponding International application No. PCT/US2021/036288, mailed Sep. 9, 2021, 20 pages.

*Primary Examiner* — Evan H MacFarlane

(74) *Attorney, Agent, or Firm* — Day Pitney LLP; George Chaclas

(57) ABSTRACT

A re-scaler for a multi-ply cutter includes a cutter table and a cutter frame. The cutter frame includes a fixed re-sealer end attached to an overlay film. The overlay film covers a workpiece on the cutter table through a movable re-sealer end, which is longitudinally displaced along the table and includes a swing arm on each side of the table. The cutter frame further includes a mandrel attached between the swing arms of the movable re-sealer end and the overlay film. Each of the swing arms include an actuator attached thereto, providing rotation of each of the swing arms in a first direction about an axis of the actuator thereby raising the mandrel above the table. The actuators also include a down stop preventing rotation of the swing arm in a second direction thereby establishing a minimum height of the mandrel above the table.

15 Claims, 3 Drawing Sheets

(56) References Cited

U.S. PATENT DOCUMENTS

| | | | | |
|---|---|---|---|---|
| 5,289,748 | A * | 3/1994 | Kuchta | B26F 1/3813 83/56 |
| 5,775,632 | A | 7/1998 | Huerta | |
| 6,050,164 | A | 4/2000 | Kuchta | |
| 2008/0028904 | A1 * | 2/2008 | Arikita | B26D 7/018 83/167 |

* cited by examiner

RE-SEALER FOR A MULTI-PLY CUTTER

CROSS-REFERENCE TO RELATED APPLICATIONS

This patent application claims the benefit of priority to U.S. Provisional Patent Application Ser. No. 63/036,132, filed on Jun. 8, 2020. The content of the referenced provisional patent application is incorporated herein by reference in its entirety for any purpose whatsoever.

BACKGROUND OF THE INVENTION

1. Field of Invention

The invention relates to a re-sealer for a multi-ply cutter. Specifically, a re-sealer for a multi-ply cutter including a movable re-sealer end and a fixed re-sealer end.

2. Description of the Related Art

A re-sealer is a system utilized on a multi-ply cutter to optimize vacuum holddown. The fabric workpiece is commonly held in place with a vacuum and is sealed with a consumable overlay film. Consequently, when the cutter head of the multi-ply cutter cuts the fabric workpiece on the cutter table, the consumable overlay film is also cut, thereby breaking the seal. Accordingly, a re-sealer is used to re-seal the previously cut fabric workpiece and consumable overlay film.

The re-sealer utilizes a reusable overlay film attached to a fixed end of the re-sealer, and wound around a spring loaded mandrel at a movable end of the re-sealer, the two re-sealer ends disposed longitudinally from each other along the multi-ply cutter. Accordingly, when the cutter table of the multi-ply cutter moves in the longitudinal direction away from the fixed end of the re-sealer, the reusable overlay film extends over the fabric workpiece on the cutter table. When the movement of the cutter table is reversed, the reusable overlay film is wound back onto the mandrel.

The re-sealers known in the art require close contact with the fabric workpiece in order to optimize the vacuum seal. This is accomplished through the use of a floating working end. Gravity acts upon the mandrel of the working end, thereby causing the mandrel to rest at the lowest possible height, generally the bristle surface of the cutting table or a height above the bristle surface when the fabric workpiece has been spread onto the cutter bristle surface. The use of gravity allows the mandrel to remain in contact with the fabric workpiece when the fabric workpiece is moved under the mandrel. Unfortunately, this system only works well for low material spread heights for the fabric workpiece. Tall material spreads may cause the mandrel to impact the leading edge of the fabric workpiece, thereby shearing the material spread. In some cases, this issue can be resolved by utilizing a compromise down position stop off the cutter table above the bristle surface to reduce the jump effect at the leading edge of the tall material spread. This arrangement, however, significantly reduces the effectiveness of the vacuum hold down for shorter spread heights.

At the other end of the re-sealer, the reusable overlay film is attached at a fixed end, and thus does not allow for quick removal of the reusable overlay film to provide for parts inspection as those cut parts of the fabric workpiece are discharged from the cutter table.

Accordingly, there is a need in the art for a re-sealer system capable of compensating for various fabric workpiece heights and providing a rapidly removable reusable overlay film.

SUMMARY OF INVENTION

An objective of the invention is to provide a re-sealer for a multi-ply cutter configured to provide optimal vacuum holddown and improved parts inspection. In accordance with a preferred embodiment, the invention includes a re-sealer system (hereinafter referred to as the "re-sealer") having a cutter table and cutter frame. The re-sealer further includes a fixed re-sealer end (hereinafter referred to as the "fixed end") and a movable re-sealer end (hereinafter referred to as the "movable end"). The fixed end is longitudinally displaced along the cutter table from the movable end. The fixed end is attached to the cutter frame and a reusable overlay film. The fixed end is also attached to vertical supports positioned on the cutter frame. Furthermore, the vertical supports are configured to provide variation of the height of the fixed end above the cutter table. It can be appreciated by those skilled in the art that the variation of the height of the fixed end can be done manually or automatically through the use of a motor under machine control.

The movable end is displaced longitudinally from the fixed end and includes a swing arm on each side of the cutter table. The swing arms are attached to a mandrel affixed to the reusable overlay film, adapted to cover a workpiece on the cutter table. Furthermore, each swing arm is attached to an actuator, allowing for rotation of the swing arms in a first direction about an axis of rotation. Thus, the rotation of the swing arms raises the mandrel above the fabric workpiece stacked on the cutter table's conveyor. Each actuator additionally includes a down stop for preventing rotation of the swing arms in a second direction. Accordingly, the down stop aids in establishing a minimum height of the mandrel above the fabric workpiece stacked on the cutter table's conveyor. Thus, regardless of the height of a fabric spread (workpiece), the re-sealer will consistently maintain optimum vacuum holddown and prevent any shearing to the fabric spread.

BRIEF DESCRIPTION OF THE DRAWINGS

The features and advantages of the invention are apparent from the description taken in conjunction with the accompanying drawings in which.

DETAILED DESCRIPTION

The present invention relates to a re-sealer 100 for a multi-ply cutter including a cutter table 105, and a cutter frame 106 supporting the bristle conveyor 104. A re-sealer in accordance with the present invention may be implemented in a sheet material cutting apparatus including a vacuum holddown system having a roller mechanism for handling air-impermeable sheets such as disclosed in U.S.

Pat. No. 3,742,802 to Maerz, issued Jul. 3, 1973, the entirety of the disclosure of which is incorporated by reference herein.

Figure 1:
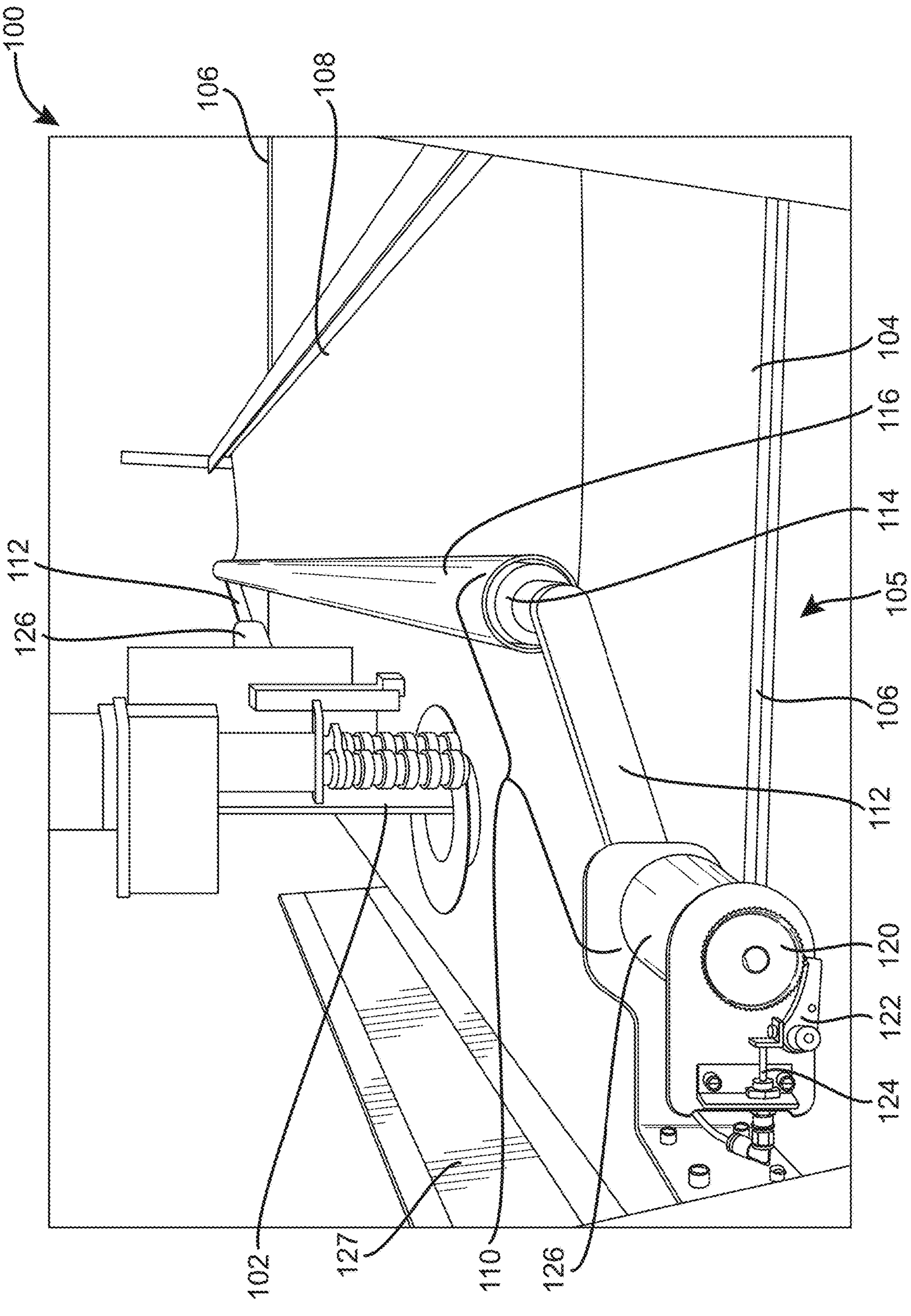
FIG. 1. illustrates a re-sealer in accordance with the invention having adjustable fixed and movable end.

FIG. 1 herein illustrates a preferred embodiment of the invention, wherein the re-sealer 100 includes a fixed end 108 distant from the cutter head 102 and a movable end 110 proximal to the cutter head 102 and longitudinally spaced along the bristle conveyor 104 from the fixed end 108.

FIG. 1 illustrates the movable end 110 including a pair of actuators 126, a pair of swing arms 112, a mandrel 114 and the reusable overlay film 116 on the mandrel 114. An actuator 126 is attached to the movable cutter beam 127 on either side of the cutter beam 127. Each actuator 126 is rotatably attached to a swing arm 112 extending upwardly and outwardly from an end of the actuator 126, supporting a mandrel 114 disposed between the two swing arms 112 and floating the mandrel 114 above the cutter table 105.

The mandrel 114 is preferably rounded, and configured to hold a roll of reusable overlay film 116 thereon. It may be appreciated by those skilled in the art that the mandrel 114 may include a spring mechanism as is well known in the art to provide rotational force on the roll of reusable overlay film 116, thereby producing constant tension on the reusable overlay film as it is extended from the mandrel 114. It may be further appreciated that the spring mechanism is capable of winding up the entirety of the roll of reusable overlay film 116, such that the roll of reusable overlay film 116 may be removed from the re-sealer 100 and stored on the cutter beam.

The actuators 126 may be any type of actuator suitable for attaching to the cutter frame 106 and providing rotational motion to the swing arm 112. The actuators 126 may be, but are not limited to, pneumatic actuators, electric actuators, or hydraulic actuators. In the case of pneumatic actuators, the actuator pairs 126 rotate together via a speed control sensor (not pictured) on the actuator 126. The actuators 126 may have a rotation of 90 degrees, and preferably a rotation of 45 degrees. An exemplary actuator for use with the invention is a rotary actuator part number CRB2BW40-90DZ from SMC Corporation. An exemplary speed sensor suitable for use in the invention is a speed controller part number AS1211F-M5-06A from SMC Corporation.

Figure 2:
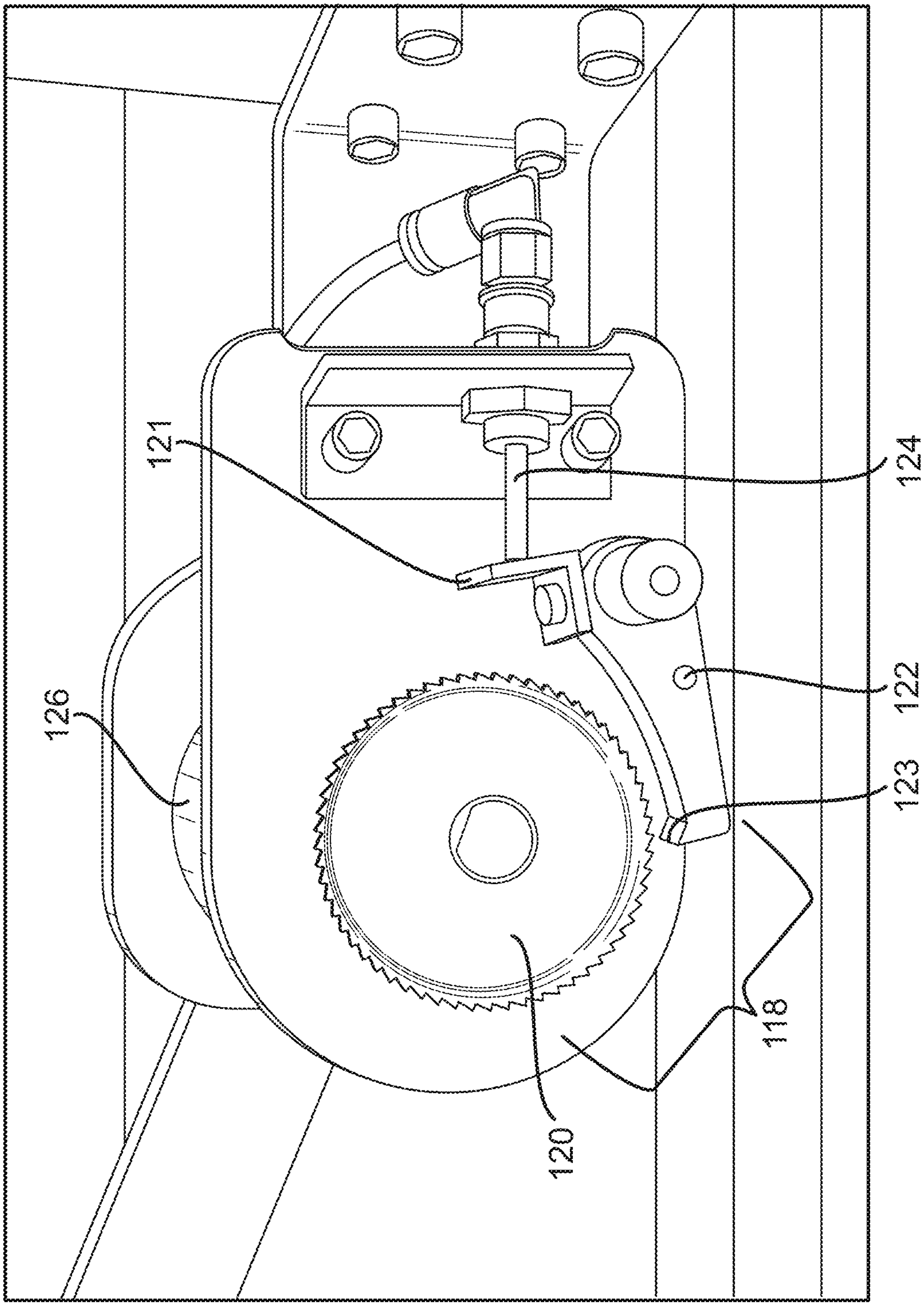
FIG. 2 illustrates a close up view of the actuator and down stop of the movable end of the re-sealer of FIG. 1.

Referring to FIG. 2, axially connected to each of actuators 126 is a down stop 118, and an actuator pin 124. The down stop 118 includes a ratchet gear 120 and a pawl 122. The ratchet gear 120 is circular having slanted teeth around the entirety of its circumference. The pawl 122 is proximal to the ratchet gear 120 and has a lever 121 at one end and a hook 123 at the other to interact with the teeth of ratchet gear 120. The actuator pin 124 is fixedly attached to the frame supporting the actuator 126 and behind the lever 121 of the pawl 122. Thus, when the actuator pin 124 is actuated, it pushes against the lever 121 of the pawl 122 rotating the pawl 122 to move hook 123 out of contact with the teeth of the ratchet gear 120. It will be appreciate that the actuator pin 124 may be controlled by pneumatic, electric or hydraulic devices.

Thus, the down stop 118 is adapted to control the lower resting position of the swing arm 112 and mandrel 114. More specifically, when the pawl 122 of the down stop 118 is disengaged, the swing arm 112 can move freely upwards or downwards. However, when the hook 123 of the pawl 122 is engaged with the slanted teeth of ratchet gear 120, the mandrel 114 may move freely upwards, but downward movement is prevented. Thus, a minimum height for the mandrel 114 above the surface of the bristle conveyor 104 is established by the down stop 118. The swing arm 112, however, may move upward when the pawl 122 is engaged. Thus, should the mandrel 114 contact a material workpiece above the current minimum height of the mandrel 114, mandrel 114 can move up and over the material spread. As the mandrel 114 moves over the higher material spread, ratchet gear 120 is rotated via swing arm 112 and a new minimum height for the mandrel 114 is set by pawl 122. At any time, should a lower minimum height for mandrel 114 be desired, actuation of actuator pin 124 may disengage down stop 118 thereby allowing mandrel 114 to descend by gravity to a lower position relative to the cutter table 105. Shearing of the workpiece material spread is eliminated by setting the down stop 118 of the mandrel 114 at a position above the bristle conveyor 104 and somewhat below the height of the workpiece material spread.

Figure 3:
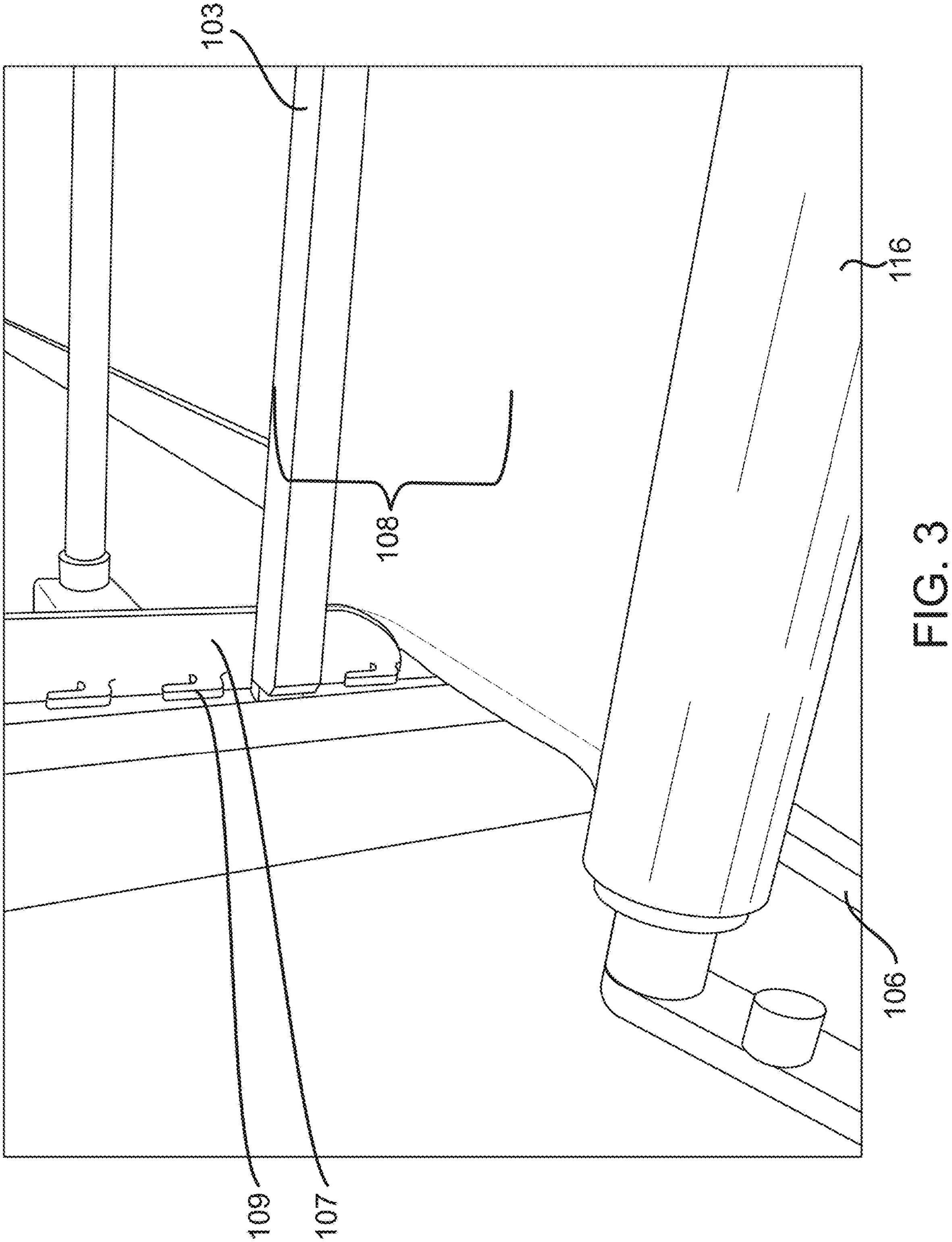
FIG. 3 illustrates the height adjustment of the fixed end of the re-sealer of FIG. 1.

As illustrated in FIG. 3, the fixed end 108 of re-sealer 100 may be attached to the cutter frame 106 at the discharge end of the cutter table. The fixed end 108 preferably includes the reusable overlay film fixedly attached to a cross beam 103. Also attached to the cutter frame 106 are a pair of vertical supports 107 on either side of the cutter frame 106. Each of the vertical supports 107 may include a plurality of slots 109, allowing the cross beam 103 to be manually set at one of a plurality of heights above the cutter table 105. The plurality of slots 109 are equally spaced vertically along vertical supports 107, and configured such that the cross beam 103 may be attached to corresponding slots 109, thereby positioning cross beam 103 parallel to the surface of cutter table 105.

In one embodiment of the invention, a user of the re-sealer 100 may manually adjust the height of the fixed end 108 by lifting the cross beam 103 from one corresponding set of the plurality of slots 109 and placing the cross beam 103 onto another corresponding set of slots 109. In another embodiment, the fixed end 108 may include a plurality of spring pins (not shown) positioned at each slot, along the height of the vertical supports 107, and configured to move the cross beam 103 vertically along the vertical supports 107 when operated by a user. In yet another embodiment, the fixed end may be vertically movable under machine control. In yet another embodiment, the cross beam 103 may be entirely removable from the cutter frame 106 and stored on the cutter beam 127, allowing for inspection of the cut parts as they are discharged from the cutter table 105 and easily redeployed when required. It may be appreciated by those skilled in the art that a distinct advantage of fixed end 108 is that cross beam 103 may be manually repositioned (i.e., by hand and without tools), or automatically under machine control. Indeed, such repositioning may include removal from the cutter frame 106 entirely.

Although this invention has been shown and described with respect to exemplary embodiments thereof, it should be understood by those skilled in the art that the foregoing and various other changes, omissions, and additions in the form of detail thereof may be made therein without departing from the spirit and scope of the invention. For example, while the roll of reusable overlay film 116 is illustrated as being supported on mandrel 114 and fixed to cross beam 103, the roll of reusable overlay film 116 could also be supported by cross beam 103 and fixed to mandrel 114. Accordingly, the present invention has been shown and described by way of illustration rather than limitation.

What is claimed:

1. A multi-ply cutter comprising:

a cutter table;

a cutter beam;

a cutter frame; and a re-sealer including:
a fixed re-sealer end attached to an overlay film;
a movable re-sealer end longitudinally displaced along the cutter table from the fixed re-sealer end, the movable re-sealer end including a first swing arm on a first side of the cutter table and a second swing arm on a second side of the cutter table;
a mandrel attached between the swing arms of the movable re-sealer end and attached to the overlay film;
at least one actuator attached to at least one of the swing arms providing rotation of the at least one of the swing arms in a first direction about an axis of the at least one actuator thereby raising the mandrel above the cutter table; and
a down stop limiting rotation of at least one of the swing arms in a second direction thereby establishing a minimum height of the mandrel above the cutter table;
wherein the movable re-sealer end is adapted to cover a workpiece on the cutter table with the overlay film.

2. The multi-ply cutter according to claim 1, wherein the mandrel is supporting a roll of the overlay film.

3. The multi-ply cutter according to claim 1, wherein each of the at least one actuator is selected from the group consisting of a pneumatic actuator, an electric actuator, and a hydraulic actuator.

4. The multi-ply cutter according to claim 1, wherein the at least one actuator includes an actuator pin for engaging the down stop, the down stop includes a ratchet gear and a pawl, and the pawl includes a lever at a first end acted upon by the actuator pin, and the pawl further includes a hook at a second end for engaging with the ratchet gear.

5. The multi-ply cutter according to claim 1, wherein two vertical supports are attached to the cutter frame, the overlay film of the fixed end is attached to a cross beam, and wherein the cross beam is positioned between the two vertical supports on the first and second sides of the cutter frame.

6. The multi-ply cutter according to claim 5, wherein the cross beam is removable from the vertical supports.

7. The multi-ply cutter according to claim 5, wherein the fixed end is repositionable vertically about the vertical supports above the cutter table.

8. The multi-ply cutter according to claim 7, wherein the vertical supports include a plurality of slots along heights of the vertical supports for manually repositioning the fixed end.

9. A re-sealer assembly for a multi-ply cutter, the multi-ply cutter including a cutter table and a cutter beam, the re-sealer assembly comprising:
a cutter frame configured to couple to the multi-ply cutter;
vertical supports coupled to the cutter frame, each of the vertical supports including a plurality of attachment slot points;
a movable re-sealer end configured to be attached to the cutter beam and including an overlay film, the movable re-sealer end adapted to cover workpieces on the cutter table with the overlay film; and
a fixed re-sealer end longitudinally configured to be mounted displaced along the cutter table from the movable re-sealer end, the fixed re-sealer end being configured to attach to the cutter frame at any one of the plurality of attachment slot points on the vertical supports, thereby permitting height variations of the fixed re-sealer end above the cutter table to vary a position of the overlay film with respect to the workpieces based upon a thickness of the workpieces, wherein the movable re-sealer end includes: a first swing arm positionable on a first side of the cutter frame; a second swing arm positionable on a second side of the cutter frame; and a mandrel positioned between the swing arms, the mandrel configured to support the overlay film and wherein the first swing arm is attached to a first actuator positionable on the first side of the cutter frame, the second swing arm is attached to a second actuator positionable on the second side of the cutter frame, the first and second actuators configured to move the swing arms about an axis into a first position above the cutter table, and wherein the first actuator includes a first actuator pin for engaging a first down stop on the first actuator and the second actuator includes a second actuator pin for engaging a second down stop on the second actuator to limit rotation of the swing arms in a second direction thereby establishing a minimum height of the mandrel above the cutter table.

10. The re-sealer assembly according to claim 9, wherein one of the first or second actuator is selected from the group consisting of a pneumatic actuator, an electric actuator, and a hydraulic actuator, and wherein the down stops of each of the first and second actuator includes a ratchet gear and a pawl.

11. The re-sealer assembly according to claim 9, wherein the fixed re-sealer end includes a cross beam attached to the cutter frame and the overlay film is attached to the cross beam and wherein the plurality of attachment slot points are for manually repositioning the cross beam of the fixed re-sealer end above the cutter table at a plurality of fixed predetermined heights by a user based upon review of a height of the workpieces to maintain the overlay film against the workpieces to prevent shearing of the respective workpiece.

12. The re-sealer assembly according to claim 11, wherein the cross beam is selectively removable from the cutter frame to allow for inspection of the workpieces after cutting.

13. A re-sealer for a multi-ply cutter, the multi-ply cutter including a cutter table and a cutter frame, comprising:
a fixed re-sealer end;
a movable re-sealer end having an overlay film and longitudinally configured to be displaced along the cutter table from the fixed re-sealer end, the movable re-sealer end including a first swing arm positionable on a first side of the cutter table and a second swing arm positionable on a second side of the cutter table, wherein the overlay film extends to the fixed re-sealer end;
a mandrel attached between the first and second swing arms of the movable re-sealer end and configured to be attached to the overlay film;
at least one actuator attached to at least one of the first swing arm or second swing arm for providing rotation of the respective first or second swing arm in a first direction about an axis of the at least one actuator thereby raising the mandrel above the cutter table;
a down stop preventing rotation of the respective first or second swing arm in a second direction for establishing a minimum height of the mandrel above the cutter table; and
vertical supports configured to be attached to the cutter frame to provide for variation of a height of the fixed re-sealer end above the cutter table,
wherein the fixed re-sealer end and the movable re-sealer end are adapted to cover a workpiece on the cutter table with the overlay film.

14. The re-sealer according to claim 13, wherein the fixed re-sealer end includes a cross beam that is attached to the vertical supports and the vertical supports provide for variation of the height of the fixed re-sealer end by adjusting a height of the cross beam above the cutter table.

15. The re-sealer according to claim 13, wherein the multi-ply cutter includes a cutter beam and the fixed re-sealer end is configured to be set in a fixed position with respect to the cutter beam.

* * * * *